(12) United States Patent
Filippov et al.

(10) Patent No.: US 11,215,034 B2
(45) Date of Patent: Jan. 4, 2022

(54) CONTROLLING REDISTRIBUTION OF SUSPENDED PARTICLES IN NON-NEWTONIAN FLUIDS DURING STIMULATION TREATMENTS

(71) Applicant: Landmark Graphics Corporation, Houston, TX (US)

(72) Inventors: Andrey Filippov, Houston, TX (US); Jianxin Lu, Bellaire, TX (US)

(73) Assignee: Landmark Graphics Corporation, Houston, TX (US)

( * ) Notice: Subject to any disclaimer, the term of this patent is extended or adjusted under 35 U.S.C. 154(b) by 107 days.

(21) Appl. No.: 16/487,347

(22) PCT Filed: Apr. 19, 2017

(86) PCT No.: PCT/US2017/028426
§ 371 (c)(1),
(2) Date: Aug. 20, 2019

(87) PCT Pub. No.: WO2018/194597
PCT Pub. Date: Oct. 25, 2018

(65) Prior Publication Data
US 2020/0056459 A1 Feb. 20, 2020

(51) Int. Cl.
*E21B 43/16* (2006.01)
*E21B 41/00* (2006.01)
(Continued)

(52) U.S. Cl.
CPC ............ *E21B 41/0092* (2013.01); *C09K 8/80* (2013.01); *E21B 43/16* (2013.01); *E21B 43/267* (2013.01);
(Continued)

(58) Field of Classification Search
CPC .............................. E21B 43/16; E21B 2200/20
See application file for complete search history.

(56) References Cited

U.S. PATENT DOCUMENTS 8,855,988 B2 * 10/2014 Strobel .................. G06F 30/20
703/10
2003/0075315 A1 4/2003 Nguyen et al.
(Continued)

FOREIGN PATENT DOCUMENTS

WO WO 2016/048663 A1 3/2016
WO WO 2018/118012 A1 6/2018

OTHER PUBLICATIONS

Dhole et al., "Drag of a Spherical Bubble Rising in Power Law Fluids at Intermediate Reynolds Numbers," *Industrial & Engineering Chemistry Research*, vol. 46(3), pp. 939-946, Dec. 2006.
(Continued)

*Primary Examiner* — Catherine Loikith
(74) *Attorney, Agent, or Firm* — Haynes and Boone, LLP

(57) ABSTRACT

System and methods for controlling suspended particle redistribution during stimulation treatments. Fluid flow in a wellbore is simulated for a stimulation treatment to be performed along a section of the wellbore within a subterranean formation, based on a flow model associated with the wellbore. Based on the simulation, dimensionless parameters characterizing a flow of suspended particles within a treatment fluid to a fractured area of the formation via at least one perforation along the section of the wellbore are calculated. A collection efficiency of the suspended particles within the fluid is determined, based on the dimensionless parameters. The collection efficiency is used to calculate a flow rate of the suspended particles to the fractured area of the formation via the perforation. The flow rate is used to estimate an amount of the suspended particles to be injected into the wellbore during the stimulation treatment along the wellbore section.

20 Claims, 7 Drawing Sheets

(51) Int. Cl.
  *C09K 8/80* (2006.01)
  *E21B 43/267* (2006.01)
  *G06N 5/04* (2006.01)
  *G06F 111/10* (2020.01)

(52) U.S. Cl.
  CPC ............ *G06N 5/04* (2013.01); *E21B 2200/20* (2020.05); *G06F 2111/10* (2020.01)

(56) References Cited

U.S. PATENT DOCUMENTS

| | | |
|---|---|---|
| 2010/0132946 A1 | 6/2010 | Bell et al. |
| 2011/0209868 A1 | 9/2011 | Dusterhoft et al. |
| 2015/0075777 A1 | 3/2015 | Walters et al. |
| 2017/0122077 A1* | 5/2017 | Shahri ................... G06F 30/20 |
| 2017/0298713 A1* | 10/2017 | Shetty ................... E21B 49/08 |

OTHER PUBLICATIONS

International Search Report and the Written Opinion, dated Jan. 2, 2018, PCT/US2017/028426, 17 pages, ISA/KR.

Tripathi et al., "Power Law Fluid Flow Over Spheroidal Particles," *Industrial & Engineering Chemistry Research,* vol. 33(2), pp. 403-410, Feb. 1994.

\* cited by examiner

CONTROLLING REDISTRIBUTION OF SUSPENDED PARTICLES IN NON-NEWTONIAN FLUIDS DURING STIMULATION TREATMENTS

CROSS-REFERENCE TO RELATED APPLICATION

The present application is a U.S. National Stage patent application of International Patent Application No. PCT/US2017/028426, filed on Apr. 19, 2017, the benefit of which is claimed and the disclosure of which is incorporated herein by reference in its entirety.

FIELD OF THE DISCLOSURE

The present disclosure relates generally to downhole stimulation treatments, and particularly, to the redistribution of proppants during such treatments.

BACKGROUND

Fracturing treatments are commonly used in subterranean operations, among other purposes, to stimulate the production of hydrocarbons (e.g., oil and natural gas) from a subterranean formation. For example, hydraulic fracturing treatments generally involve injecting a treatment fluid (e.g., a fracturing fluid) into the formation via injection points or perforations along a wellbore drilled within the formation. The treatment fluid may be injected or pumped at a sufficient hydraulic pressure to create or enhance one or more fractures that propagate from the perforations through the surrounding formation. The creation and/or enhancement of these fractures may enhance hydrocarbon production from the subterranean formation.

In order to maintain and/or enhance the conductivity of a fracture in a subterranean formation, proppant may be deposited in the fracture, for example, by introducing a high viscosity fracturing fluid carrying proppant particles into the subterranean formation. The proppant may prevent the fractures from fully closing upon the release of hydraulic pressure, forming conductive channels through which fluids may flow to the wellbore. During the treatment operation, a diverting agent may be injected into the formation to divert the treatment fluid toward perforations along the wellbore and thereby, improve the fluid distribution across all of the perforations and associated fractures in the formation.

Flow models have been used to simulate fluid flow in hydraulic fracturing treatments and other environments. For example, such models may be used to simulate the flow of proppant or other materials (e.g., diverter) injected into a subterranean formation.

DESCRIPTION OF ILLUSTRATIVE EMBODIMENTS

Figure 1:
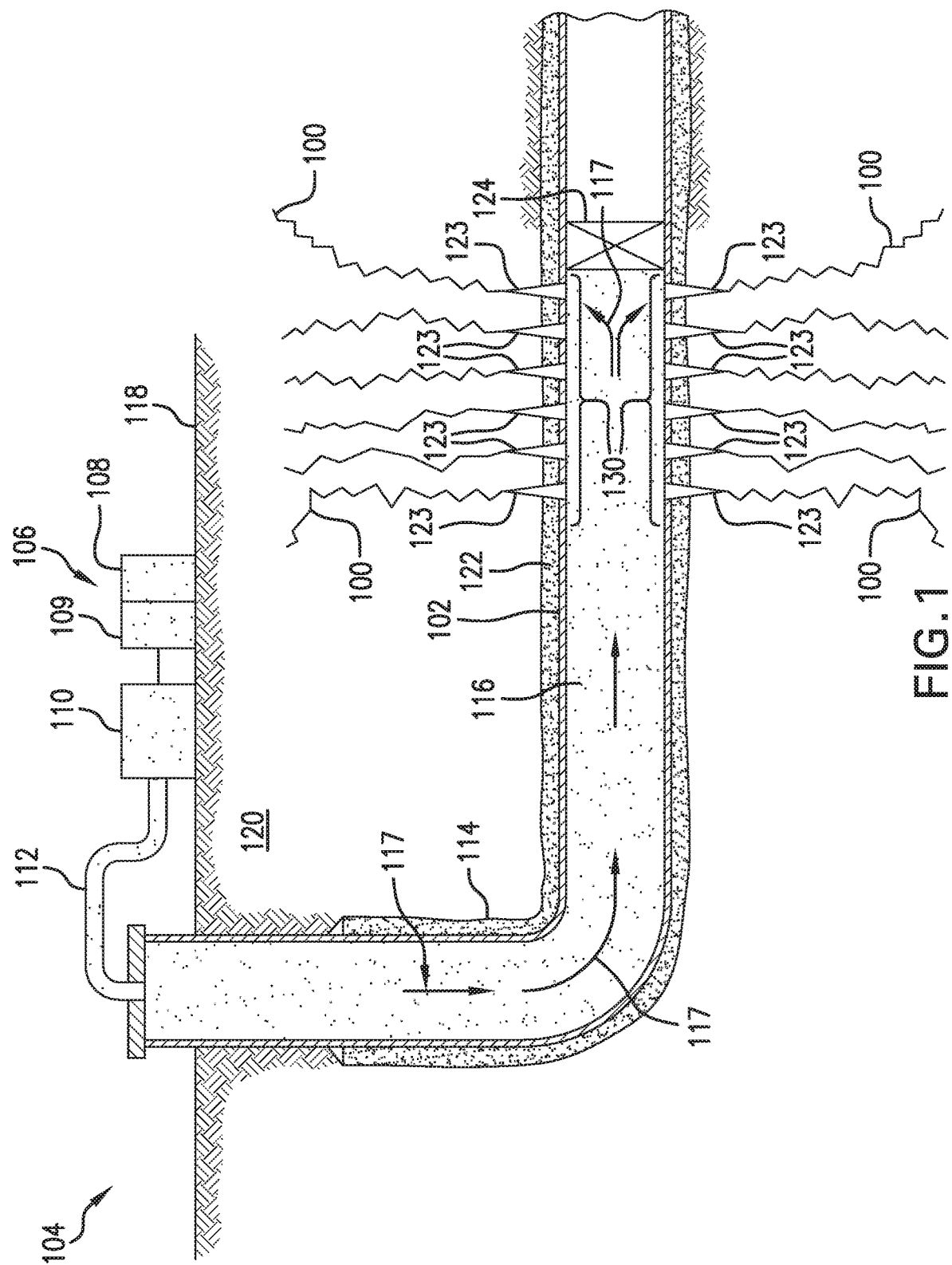
FIG. 1 is a schematic view of an illustrative well system for performing a hydraulic fracturing operation within a subterranean formation.

Embodiments of the present disclosure relate to controlling the distribution or redistribution of suspended particles within non-Newtonian fluids during downhole stimulation treatments. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Embodiments of the present disclosure may be used to analyze fluid flow during downhole operations for stimulating the production of hydrocarbons (e.g., oil and/or natural gas) from subterranean formations. Examples of such stimulation operations include, but are not limited to, hydraulic fracturing and matrix acidizing operations. In one or more embodiments, one or more fluid flow models may be used to predict particle flow rates to individual fractures within a subterranean formation during a stimulation operation performed along a wellbore drilled within the formation. The particles may be, for example, proppant particles suspended within a non-Newtonian treatment fluid, e.g., a hydraulic fracturing fluid, which is injected into the fractures via one or more perforations along a section of the wellbore. The term "non-Newtonian" as used herein refers to any fluids whose viscosity changes with the local flow shear rate. The perforations may connect the fractures to the wellbore. The flow rates of the proppant particles in this example may be estimated based on pre-calculated dependencies of proppant collection or delivery efficiency on dimensionless parameters describing the local flow of particles around an individual perforated exit or outlet from the wellbore.

While the examples provided herein may be described in the context of proppant delivery to fractures, it should be appreciated that embodiments of the present disclosure are not intended to be limited thereto and that the disclosed embodiments may be applied to other types of particle suspensions that may be injected downhole during hydrocarbon recovery operations. For example, the disclosed techniques may be applied to particles of a diverter or diverting agent injected into the formation during a diversion phase of the stimulation operation performed along a perforated section of the wellbore. Further, the disclosed techniques may be applied to the distribution of both proppant and diverter at different times during the same stimulation operation. The stimulation operation in this example may be a multi-stage stimulation treatment in which different stages of the treatment may correspond to different sections of the wellbore within the formation.

As will be described in further detail below, the aforementioned flow model(s) may be used to account for the effect of non-Newtonian properties of the treatment fluid. In one or more embodiments, inter-phase interactions between the particles and treatment fluid may be modeled using a customized drag law. A new form of Stokes number for non-Newtonian flow may be derived based on such a drag law. Further, a new correlation may be generated for calculating particle transport efficiency in case of non-Newtonian fluid systems.

The terms "collection efficiency", "delivery efficiency" and "transport efficiency" are used interchangeably herein to refer to a measure of the difference in particle (e.g., proppant) concentration of the treatment fluid between locations in the wellbore and in the fracture or around a perforation along the wellbore. In some implementations, the perforation or perforated section of the wellbore may be modeled as a circular pipe having a relatively small diameter with an inlet and an outlet from the wellbore. The collection efficiency for suspended particles, e.g., proppant particles, within a treatment fluid (or "carrier fluid") may be defined as a ratio between the actual flow rate of the particles to the perforation and a maximum flow rate for the particles. The maximum particle flow rate may be defined as product of the particle average concentration in the wellbore and the average flow velocity in the perforation. Low collection efficiency may occur, for example, in cases where there may be less particle intake at the inlet of the perforation (or circular pipe). In such cases, a large portion of the proppant may not enter the perforation.

Because the flow conditions around each of the perforations may be different, the amount of proppant carried to each fracture may vary. The proppant inertia may also be taken into account for high flow rates and small diameters of the perforations, when the proppant does not follow the flow streamlines and the efficiency of proppant delivery to fractures decreases.

In some environments, the flow of fluid (e.g., fracturing fluid) may be unsteady and multi-dimensional. For example, in some types of fractures, a dominant flow may be two-dimensional (2D) and may include transient behaviors. In one or more embodiments, a 2D or three-dimensional (3D) flow may be described using a one-dimensional (1D) flow model, for example, by integrating the governing flow equations over the cross-section of the 2D or 3D flow path. Alternatively, resulting equations may include nonlinear partial differential equations that may be solved using finite difference, finite volume, and/or finite element methods. The use of 1D flow models may reduce computational costs, and may allow for faster or more computationally efficient simulations. Additionally, a flow model may be used to perform numerical simulations in real time, for example, during a fracture treatment or during another well system activity.

In one or more embodiments, a fluid flow model may be used to simulate a flow of fluid in a fracture during hydraulic fracturing or other type of stimulation treatment. Additionally, such a fluid flow model may be used to simulate the flow and distribution of proppant in a fracture during a stimulation treatment. Such a stimulation treatment may involve, for example, injecting a treatment or fracturing fluid with proppant into the fracture via one or more perforations along the wellbore in order to improve the conductivity of the surrounding formation and/or hydrocarbon reservoir therein. Simulating fluid flow, including proppant transport, in the wellbore and fracture may help to efficiently design, analyze, and/or optimize the treatment. In one or more embodiments, the simulation may combine a plurality of models to simulate fracture propagation, rock deformation, fluid flow in the wellbore and/or fracture, proppant transport, and other phenomena for the stimulation treatment. Such models may be utilized in the simulation to account for complex physical conditions of the subterranean formation.

In stimulation treatments, such as hydraulic fracturing treatments, proppant may play an important role by preventing the closure of fractures, and thus, may improve the production from a hydrocarbon reservoir. The proppant may be delivered to individual fractures by a fracturing fluid, which may include an aqueous based fluid and/or additives (e.g., gelling agents) to increase viscosity of the fracturing fluid and reduce the particle sedimentation by gravity.

An aqueous based fluid may include, for example, fresh water or salt water. Salt water may include, but is not limited to, unsaturated salt solutions and saturated salt solutions, e.g., brines and seawater. Generally, salt may be added to the water to provide clay stability and to increase the density of the aqueous based fluid. Examples of salts that may be used include, but are not limited to, sodium chloride, sodium bromide, calcium chloride, potassium chloride, ammonium chloride and mixtures thereof. The concentration of salt or salts in the salt water may be, for example, up to about 66% by weight thereof and the salt water can have a density up to about 15.5 pounds per gallon. The amount of water in the fracturing fluid may be, for example, from about 80% to about 99.9%, depending on the concentration of salt and additives.

Gelling agents may be included in the fracturing fluid to increase the fracturing fluid's viscosity, which may be desired for a number of reasons in subterranean applications. For example, an increase in viscosity may be used for transferring hydraulic pressure to divert treatment fluids to another part of a formation or for preventing undesired leak-off of fluids into a formation from the buildup of filter cakes. The increased viscosity of the gelled or gelled and cross-linked treatment fluid, among other things, may reduce fluid loss and may allow the fracturing fluid to transport significant quantities of suspended proppant particulates. Gelling agents may include, but are not limited to, any suitable crosslinkable polymer. Examples of such crosslinkable polymers include, but are not limited to, galactomannan gums, cellulose derivatives, combinations thereof, derivatives thereof, and the like. Galactomannan gums are generally characterized as having a linear mannan backbone with various amounts of galactose units attached thereto. Examples of suitable galactomannan gums include, but are not limited to, gum arabic, gum ghatti, gum karaya, tamarind gum, tragacanth gum, guar gum, locust bean gum, combinations thereof, derivatives thereof, and the like. Other suitable gums include, but are not limited to, hydroxyethylguar, hydroxypropylguar, carboxymethylguar, carboxymethyl-hydroxyethylguar and carboxymethylhydroxypropylguar. Examples of suitable cellulose derivatives include hydroxyethyl cellulose, carboxyethylcellulose, carboxymethylcellulose, and carboxymethylhydroxyethylcellulose, derivatives thereof, and combinations thereof. The crosslinkable polymers included in the treatment fluids of the present disclosure may be naturally-occurring, synthetic, or a combination thereof. The crosslinkable polymers may comprise hydratable polymers that contain one or more functional groups such as hydroxyl, cis-hydroxyl, carboxyl, sulfate, sulfonate, phosphate, phosphonate, amino, or amide groups. In certain systems and/or methods, the crosslinkable polymers may be at least partially crosslinked, wherein at least a portion of the molecules of the crosslinkable polymers are crosslinked by a reaction comprising a crosslinking agent. The amount of gelling agent within the fracturing fluid may range from about 5 lbs/1,000 gal to about 60 lbs/1,000 gal. Additionally, the amount of gelling agent may be up to 200 lbs/1,000 gal; however, if a low molecular weight material is used, the amount of gelling agent may exceed 200 lbs/1,000 gal.

Typically, the proppant may include a collection of solid particles that may be injected into the subterranean formation, such that the solid particles hold (or "prop") open the fractures generated during a hydraulic fracturing treatment. The proppant may include a variety of solid particles including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant may comprise graded sand. Other suitable proppant that may be suitable for use in subterranean applications may also be useful. Without limitation, the proppant may have a particle size in a range from about 2 mesh to about 400 mesh, U.S. Sieve Series. By way of example, the proppant may have a particle size of about 10 mesh to about 70 mesh with distribution ranges of 10-20 mesh, 20-40 mesh, 40-60 mesh, or 50-70 mesh, depending on, for example, the particle sizes of the formation particulates to be screen out. The proppant may be carried by the fracturing fluid. Without limitation, the proppant may be present in the fracturing fluid in a concentration of about 0.1 pounds per gallon ("ppg") to about 10 ppg, about 0.2 ppg to about 6 ppg. These ranges encompass every number in between, for example. For example, the concentration may range between about 0.5 ppg to about 4 ppg. One of ordinary skill in the art with the benefit of this disclosure should be able to select an appropriate amount of the proppant composition to use for a particular application.

In one or more embodiments, a curable resin may be coated or otherwise disposed on the proppant. Inclusion of the curable resin on the proppant may fill the fractures, providing an in-situ mechanical screen that can hold the proppant in place while maintaining integrity of the well. Curable resins suitable for use with the proppant may include any resin that is capable of forming a hardened, consolidated mass. Many such curable resins are commonly used in consolidation treatments, and some suitable curable resins may include, without limitation, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable curable resins, such as epoxy resins, may be cured with an internal catalyst or activator so that when pumped downhole, they may be cured using only time and temperature. Other suitable curable resins, such as furan resins, may generally require a time-delayed catalyst or an external catalyst to help activate the polymerization of the resins if the cure temperature is low (e.g., less than about 250° F.), but may cure under the effect of time and temperature if the formation temperature is suitable, e.g., above 250° F. or 300° F. The amount of curable resin may be from about 0.5% to about 5% v/w with respect to the proppant.

The selection of a suitable curable resin may be affected by the temperature of the subterranean formation into which the proppant is introduced. By way of example, for a subterranean formation having a bottom hole static temperature ("BHST") ranging from about 60° F. to about 250° F., two component epoxy based resins comprising a resin component that may be hardened and a hardening agent component may be used. For a subterranean formation having a BHST ranging from about 300° F. to about 600° F., a furan based resin may be preferred, for example. For a subterranean formation having a BHST ranging from about 200° F. to about 400° F., either a phenolic based resin or a one component HT epoxy based resin may be suitable, for example. For a subterranean formation having a BHST of at least about 175° F., a phenol/phenol formaldehyde/furfuryl alcohol resin may also be suitable, for example. It should be appreciated that any of various resins suitable for use in consolidation treatment applications may be selected as desired for a particular implementation.

Additionally, the fracturing fluid may comprise any number of additional additives including, but not limited to, salts, acids, fluid loss control additives, gas, foamers, corrosion inhibitors, catalysts, friction reducers, antifoam agents, bridging agents, dispersants, flocculants, H2S scavengers, CO2 scavengers, oxygen scavengers, lubricants, weighting agents and any combination thereof. It should be appreciated that any of various additives suitable for use in the fracturing fluid may be selected as desired for a particular implementation.

Illustrative embodiments and related methodologies of the present disclosure are described below in reference to FIGS. 1-7 as they might be employed, for example, in a computer system for controlling proppant distribution or redistribution during stimulation treatments that use non-Newtonian treatment fluids, e.g., hydraulic fracturing fluids. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a schematic view of an illustrative well system 104 for performing a stimulation treatment, e.g., a hydraulic fracturing operation, along a wellbore 114 within a subterranean formation 120. As shown in FIG. 1, well system 104 may include a fluid handling system 106. Fluid handling system 106 may include a fluid supply 108, mixing equipment 109, pumping equipment 110, and a wellbore supply conduit 112. The fluid supply 108 and pumping equipment 110 may be located at a surface 118 of the subterranean formation 120. Pumping equipment 110 may be fluidly coupled with the fluid supply 108 and wellbore supply conduit 112 to communicate a treatment fluid (or fracturing fluid) 117 including particles of proppant 116 from the surface 118 into wellbore 114 within the subterranean formation 120. The wellbore 114 may include a casing 102 that may be cemented (or otherwise secured) to the wall of the wellbore 114 by a cement sheath 122. While the wellbore 114 is shown in FIG. 1 as a horizontal wellbore, it should be appreciated that embodiments are not intended to be limited thereto and that the disclosed embodiments may be applied to vertical, slanted, curved, or any of various other wellbore geometries and orientations as desired for a particular implementation. Also, while not shown in FIG. 1, it should be appreciated that well system 104 may include a data processing device or computer system for controlling proppant distribution or redistribution during the stimulation treatment. Such a computer system may be located either at the wellsite in this example or at a remote location (e.g., a remote facility for monitoring and control of wellsite operations). Such a remote computer system may communicate via a network with processing devices or systems at the wellsite in order to perform the proppant redistribution techniques disclosed herein.

In one or more embodiments, the pumping equipment 110 may be used to pump or inject a pad or pre-pad fluid into an area of the subterranean formation 120 surrounding a section of wellbore 114. The fluid may be injected at an injection rate at or above the fracture gradient to create one or more fractures 100 in the surrounding formation area. The pumping equipment 110 may also be used to inject fracturing fluid 117 including particles of proppant 116 into the fractured area of the subterranean formation 120 via perforations 123 along the section of the wellbore 114. The injected proppant 116 may be used to "prop open" fractures 100 by preventing them from closing due to external forces and stresses within the surrounding formation 120. A closer view of the fractured area of the subterranean formation 120 is shown in FIG. 2.

Figure 2:
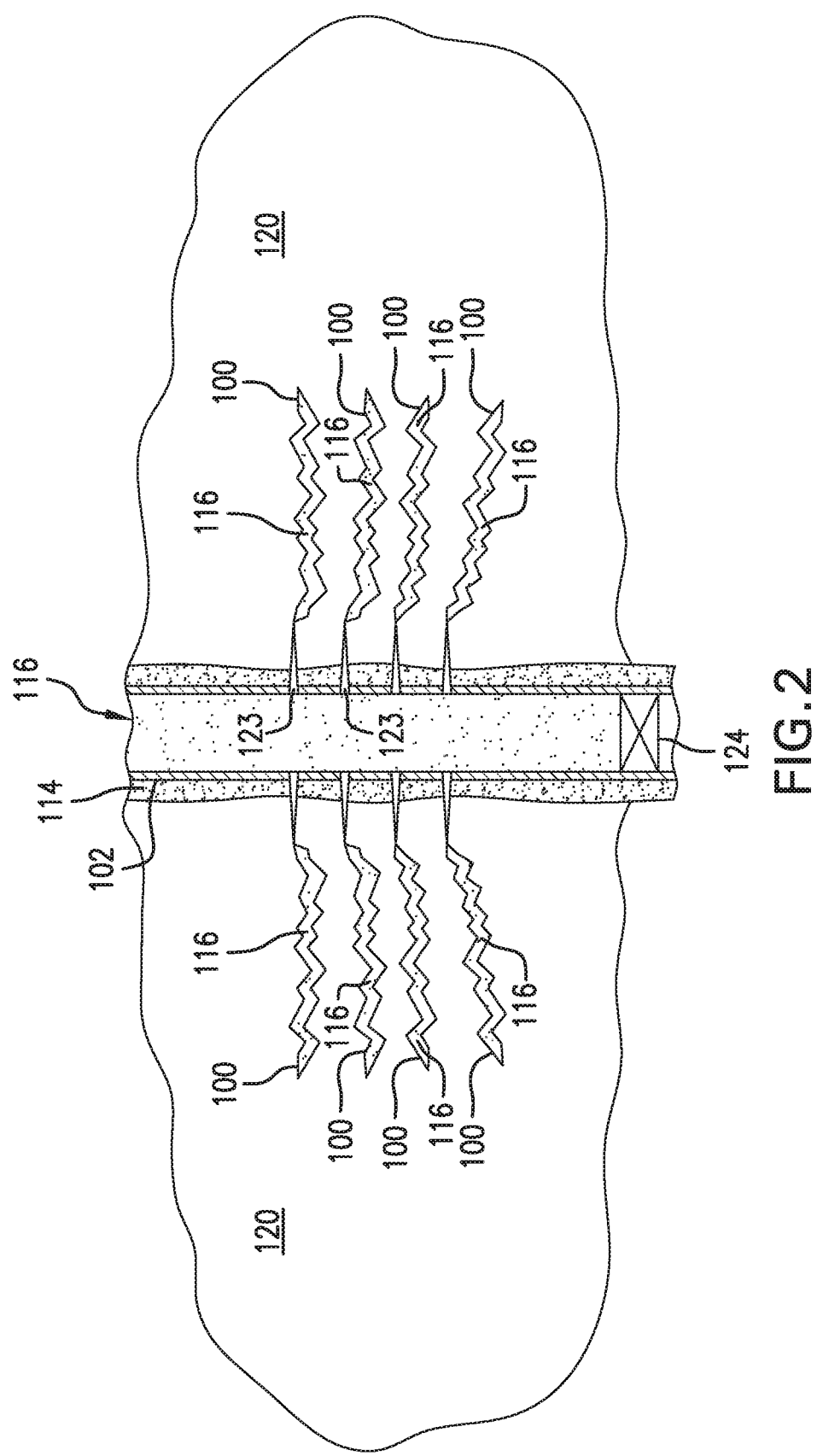
FIG. 2 is a schematic view of an example of a simulated wellbore after introduction of fracturing fluid.

As illustrated in FIG. 2, a series of perforations 123 along the section of wellbore 114 may penetrate casing 102 and cement sheath 122, thereby allowing communication of proppant 116 from the interior of wellbore 114 into fractures 100 within the surrounding subterranean formation 120. Perforations 123 may extend from the interior of casing 102, through cement sheath 122, and into subterranean formation 120. The placement of proppant 116 within fractures 100 by way of perforations 123 allows fractures 100 to be propped open during the stimulation treatment.

Returning to well system 104 as shown in FIG. 1, perforations 123 in this example may correspond to a perforated interval 130 or depth interval of interest along wellbore 114. In one or more embodiments, perforated interval 130 may be isolated with a plug 124. Plug 124 may be disposed in wellbore 114 at a location distal to (or closer to the toe of wellbore 114 than) that of perforations 123 along wellbore 114. While the perforations for only one section of the wellbore 114 are shown in FIG. 1, it should be appreciated that wellbore 114 may include additional sections that each have one or more perforations. For example, the stimulation treatment may be performed over multiple stages along different sections of the wellbore 114. Each stage of such a multi-stage stimulation treatment may correspond to a different section of the wellbore along which that stage may be performed.

In one or more embodiments, proppant 116 may be mixed with an aqueous based fluid via mixing equipment 109, thereby forming a fracturing fluid 117, which then may be pumped via pumping equipment 110 from fluid supply 108 down the interior of casing 102 and into subterranean formation 120 at or above a fracture gradient of subterranean formation 120. Pumping the fracturing fluid 117 at or above the fracture gradient of the subsurface formation 120 may create (or enhance) at least one fracture (e.g., fractures 100) extending from the perforations 123 into the subterranean formation 120. Alternatively, the fracturing fluid 117 may be pumped down production tubing, coiled tubing, or a combination of coiled tubing and annulus between the coiled tubing and the casing 102.

In one or more embodiments, the pumping equipment 110 may include a high pressure pump. Such a "high pressure pump" may be any pump that is capable of delivering the fracturing fluid 117 and/or pad/pre-pad fluid downhole at a given pressure, e.g., 1000 psi or greater. A high pressure pump may be used when it is desired to introduce the fracturing fluid 117 and/or pad/pre-pad fluid into subterranean formation 120 at or above a fracture gradient of the subterranean formation 120. However, it should be appreciated that such a pressure pump may also be used in cases where fracturing is not desired. Additionally, the high pressure pump may be capable of conveying treatment fluid including particulate matter, e.g., fracturing fluid 117 including proppant 116, into the subterranean formation 120. Examples of suitable high pressure pumps that may be used include, but are not limited to, floating piston pumps and positive displacement pumps. The initial pumping rate of the pad fluid, pre-pad fluid and/or fracturing fluid 117 may be, for example and without limitation, within a range from about 15 barrels per minute ("bbl/min") to about 80 bbl/min. However, it should be appreciated that any pumping rate sufficient to effectively create a fracture within the formation 120 and place proppant 116 into at least one fracture 100 may be used.

Additionally or alternatively, the pumping equipment 110 may include a low pressure pump, e.g., a pump that operates at a pressure of about 1000 psi or less. In some implementations, such a low pressure pump may be fluidly coupled to a high pressure pump, which in turn may be fluidly coupled to a tubular (e.g., wellbore supply conduit 112). For example, the low pressure pump may be configured to convey the fracturing fluid 117 and/or pad/pre-pad fluid to the high pressure pump. The low pressure pump in this example may "step up" the pressure of the fracturing fluid 117 and/or pad/pre-pad fluid before it reaches the high pressure pump.

Mixing equipment 109 may include a mixing tank that is upstream of the pumping equipment 110 and in which the fracturing fluid 117 may be formulated. The pumping equipment 110 (e.g., a low pressure pump, a high pressure pump, or a combination thereof) may convey fracturing fluid 117 from the mixing equipment 109 or other source of the fracturing fluid 117 to the casing 102. Alternatively, the fracturing fluid 117 may be formulated offsite and transported to the well site. At the well site, the fracturing fluid 117 may be introduced to the casing 102 via the pumping equipment 110 directly from its shipping container (e.g., a truck, a railcar, a barge, or the like) or from a transport pipeline. In either case, the fracturing fluid 117 may be drawn into the pumping equipment 110, elevated to an appropriate pressure, and then introduced into the casing 102 for delivery downhole.

The fracturing fluid 117 in this example may directly or indirectly affect one or more components or pieces of equipment associated with the preparation, delivery, recapture, recycling, reuse, and/or disposal of the fracturing fluid. For example, the fracturing fluid 117 may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant composition. The fracturing fluid 117 may also directly or indirectly affect any transport or delivery equipment used to convey the fluid to a well site or downhole. Such equipment may include, for example and without limitation, any transport vessels, conduits, pipelines, trucks, tubulars, and/or pipes used to compositionally move the fracturing fluid from one location to another, any pumps, compressors, or motors (e.g., topside or downhole) used to drive the fracturing fluid 117 into motion, any valves or related joints used to regulate the pressure or flow rate of the fracturing fluid, and any sensors (i.e., pressure and temperature), gauges, and/or combinations thereof, and the like. The fracturing fluid 117 may also directly or indirectly affect the various downhole equipment and tools that may come into contact with the fluid including, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 3:
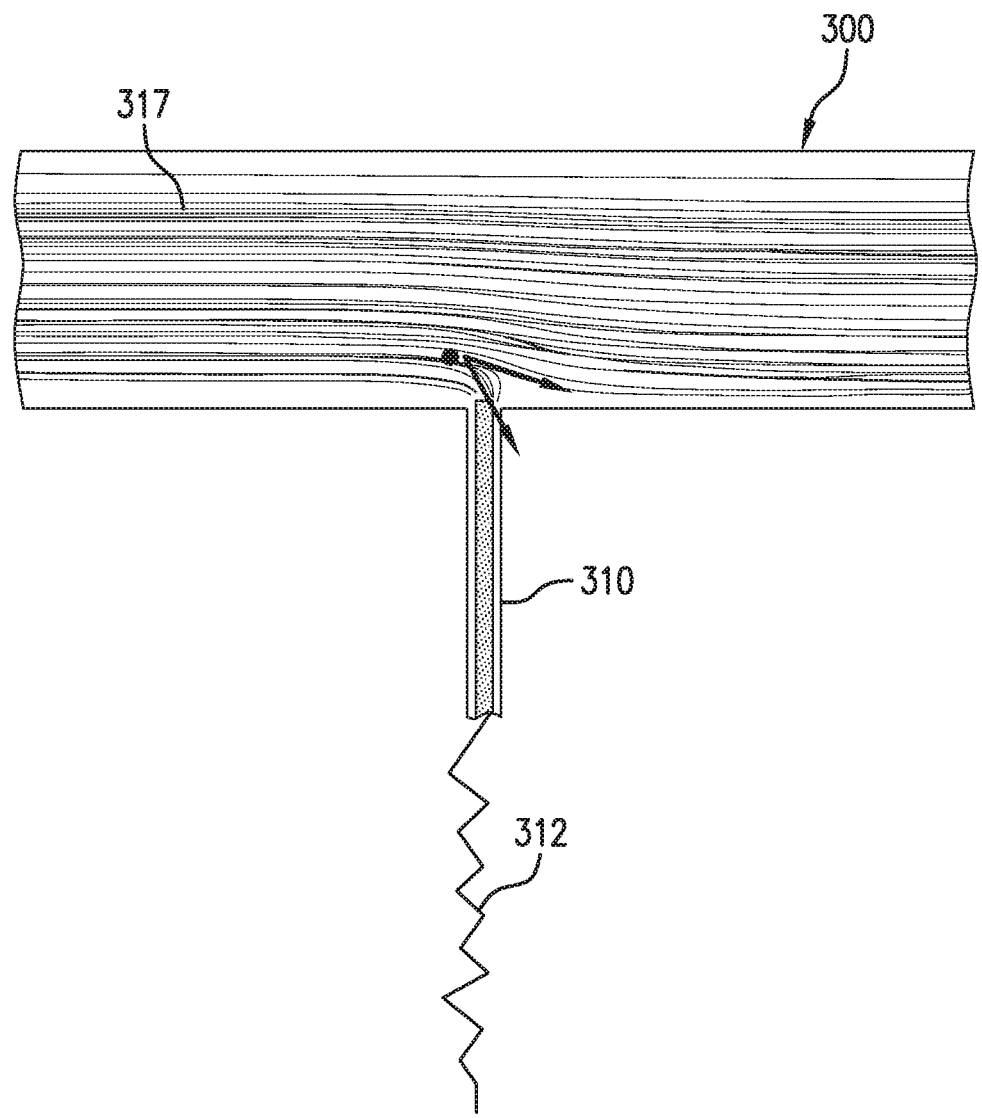
FIG. 3 is a diagram of an illustrative section of a wellbore along which a proppant particle force analysis may be performed for a stimulation treatment along the wellbore.

FIG. 3 is a diagram of an illustrative section 300 of a wellbore along which a proppant particle force analysis may be performed for a stimulation treatment along the wellbore. For example, wellbore section 300 may correspond to the perforated interval 130 of wellbore 114 of FIG. 1, as described above. As shown in FIG. 3, wellbore section 300 may include a perforation outlet 310 (e.g., corresponding to at least one of perforations 123). In one or more embodiments, the proppant particle force analysis may be performed using a flow model for simulating fluid flow in wellbore section 300 and perforation outlet 310. Such a flow model may incorporate a proppant delivery model representing the flow of proppant particles through perforation outlet 310 and into a fracture 312. For example, perforation outlet 310 may be modeled as a circular pipe of a relatively small diameter (e.g., one tenth or less of that of the wellbore or section 300 thereof). The streamlines in FIG. 3 are used to illustrate the flow of a fracturing fluid 317 carrying proppant particles through wellbore section 300 and into perforation outlet 310 and fracture 312. The arrows in FIG. 3 are used to illustrate different trajectories of the proppant particles in the fluid flow near perforation outlet 310. In some cases, the proppant may have a different trajectory than that of its carrier fluid 317.

If the parameters $Q_{lw}$ and $Q_{lf}$ are the mass flow rates of the carrier fluid 317 in the wellbore or wellbore section 300, and fracture 312, respectively, their ratio $\Pi_l$ may be expressed using Equation (1):

$$\Pi_l = \frac{Q_{lf}}{Q_{lw}} \qquad (1)$$

Similarly, the ratio of the particle mass flow rates in the wellbore $Q_{pw}$, and fracture $Q_{pf}$ may be expressed using Equation (2):

$$\Pi_p = \frac{Q_{pf}}{Q_{pw}} \qquad (2)$$

The proppant collection efficiency R of proppant diversion to fracture 312 may be defined using Equation (3):

$$R = \frac{\Pi_p}{\Pi_l} \qquad (3)$$

Equation (3) may be further simplified as Equation (4):

$$R = \frac{\alpha_{pw}}{\alpha_{pf}} \qquad (4)$$

where $\alpha_{pw}$ and $\alpha_{\pi\phi}$ are the average particle mass concentration sufficiently far upstream in the wellbore and far downstream in the fracture, respectively. In an ideal case, when particles move along the carrier fluid's streamlines, R=1. However, if the paths of the particles deviate from the liquid streamlines because of their inertia or the action of external forces, R is no longer equal to a value of 1. In particular, in the case of the deviated well geometry as shown in FIG. 1, the effect of particle inertia is always negative, and ratio R is less than a value of 1.

The dimension analysis may yield the following dimensionless parameters, which may define a local two-phase flow, e.g., as in wellbore section 300 of FIG. 3, as described above:

$$St = \frac{4}{3}\frac{\rho_p D_p}{D_f C_d \rho_l}; \quad Re = \frac{\rho_w V_w D_w}{\mu} \qquad (5)$$

$$\Lambda = \frac{V_f}{V_w}; \quad Fr = \frac{V_w^2}{gD_f}; \quad \Omega = \frac{D_w}{D_f}$$

where $\rho_p$ and $\rho_l$ are the particle and fluid density, respectively, $\mu$ is the fluid viscosity, $V_f$ and $V_w$ are the average fluid speed in the fracture (e.g., fracture 312 of FIG. 3) and the wellbore, respectively, g is the gravity acceleration, $D_f$ and $D_w$ are the diameters of the fracture and the wellbore, respectively, Fr is the Froude number, Re is the Reynolds number, St is the Stokes number and $C_d$ is a characteristic drag coefficient. It is assumed that the fracture diameter is small enough (e.g., one tenth or less of that of the wellbore), so that the gravity effect on the particle motion near the junction is negligible.

In the case of non-Newtonian power-law fluid, the viscosity depends on the liquid's shear rate and shear stress, as expressed by Equation (6):

$$\tau = k\gamma^n; \quad \gamma = \left(\frac{\partial u_l}{\partial y}\right); \quad \mu = \frac{\partial \tau}{\partial \gamma} \quad (6)$$

where $\gamma$ is the shear strain, $\tau$ is the shear stress, k is the viscosity index, and n is the power-law index. For power-law fluid flow near a spherical particle, the drag law can be defined using Equation (7):

$$C_d = \frac{24}{Re_p}(1 + 0.418 Re_p^{2.35n/(2.42n+0.918)}) \quad (7)$$

Thus the Stokes number for non-Newtonian power-law fluid can be defined as follows:

$$St = \frac{4}{3}\frac{\rho_p D_p}{h_f \rho_l} \Big/ \left[\frac{24}{Re_p}(1 + 0.418 Re_p^{2.35n/(2.42n+0.918)})\right] \quad (8)$$

$$Re_p = \frac{\rho_l (u_p)^{2-n} D_p^n}{k}$$

The dependence of the proppant collection efficiency on the parameters St and $\Lambda$ may be determined numerically by solving equations of particle and fluid motion with geometry of the fracture entrance area, e.g., perforation outlet 310 of FIG. 3, as described above. In one or more embodiments, dependencies of the collection efficiency on such dimensionless parameters may be pre-calculated to improve the efficiency and speed of the calculations performed during real-time applications. The pre-calculated dependencies may be stored in a local or remote data store accessible to a computer system for controlling the redistribution of suspended particles within a treatment fluid, e.g., carrier fluid 317, during a stimulation treatment. For example, the computer system may obtain the pre-calculated dependencies from the data store via a communication pathway or network during the stimulation treatment and use the obtained dependencies to determine the collection efficiency of the suspended particles within the treatment fluid.

Figure 4:
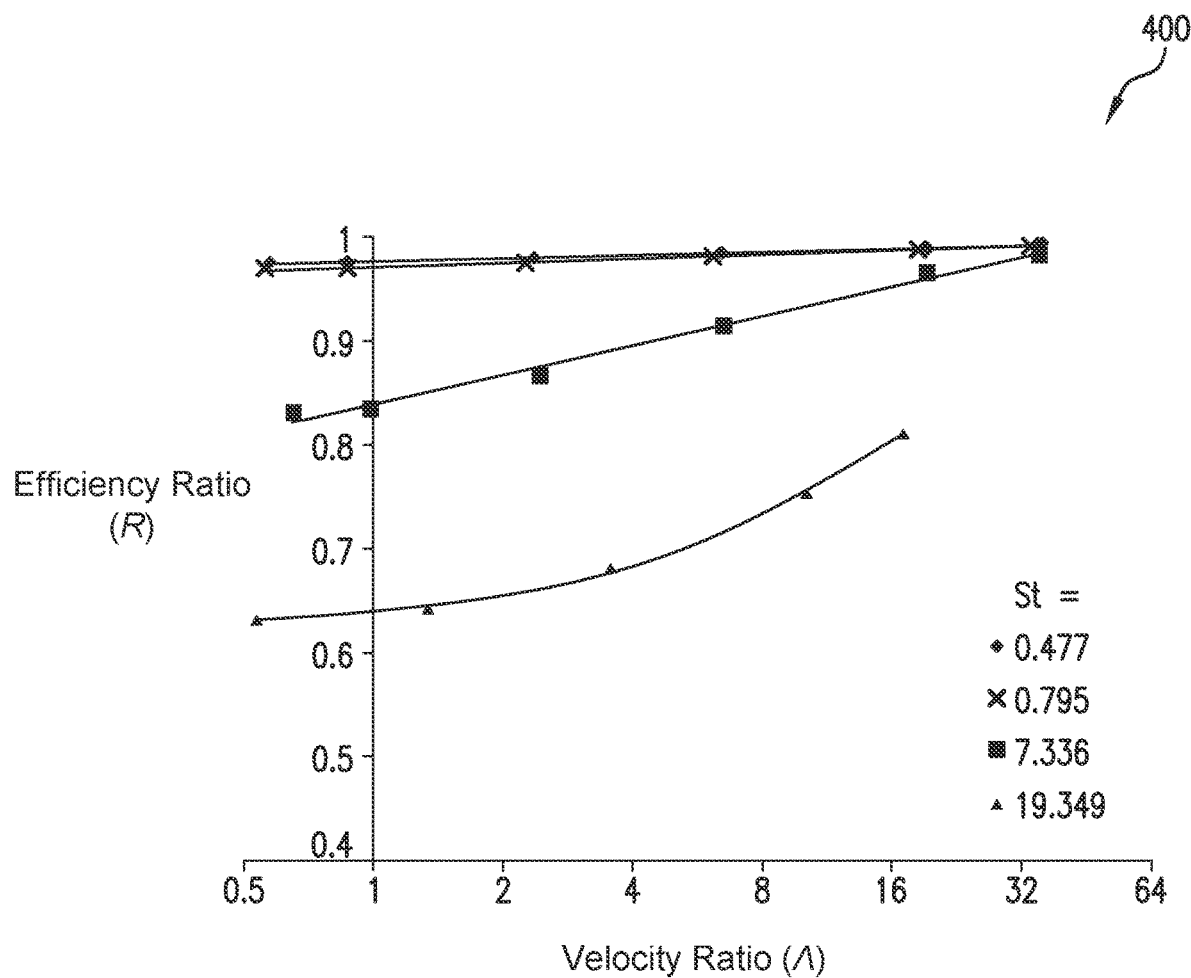
FIG. 4 is a plot graph of a dependence R(Λ) calculated for different values of a Stokes number.

FIG. 4 is a plot graph 400 illustrating the dependence $R(\Lambda)$ calculated for various values of a Stokes number in a simulated example. Proppant collection efficiency R may be a function of the fracture-wellbore fluid flow rate ratio $\Lambda$ calculated for different values of Stokes number in the case of a non-Newtonian fluid. The fluid flow rate ratio is a ratio of a flow rate of the fracturing fluid in the fracture versus a flow rate in the wellbore. As expected, the efficiency may be close to 1 at low values of St, but may decrease monotonously with increasing St. Calculations performed for a range of pipe diameters and flow velocities showed weak effects of fracture-wellbore diameter ratio $\eta$ and Reynolds number on the proppant collection efficiency. These results may imply that the proppant collection efficiency R can be considered depending only on the Stokes number and ratio of velocities $\Lambda$, provided the proppant concentration is low enough (e.g., less than about 10% by volume).

Figure 5:
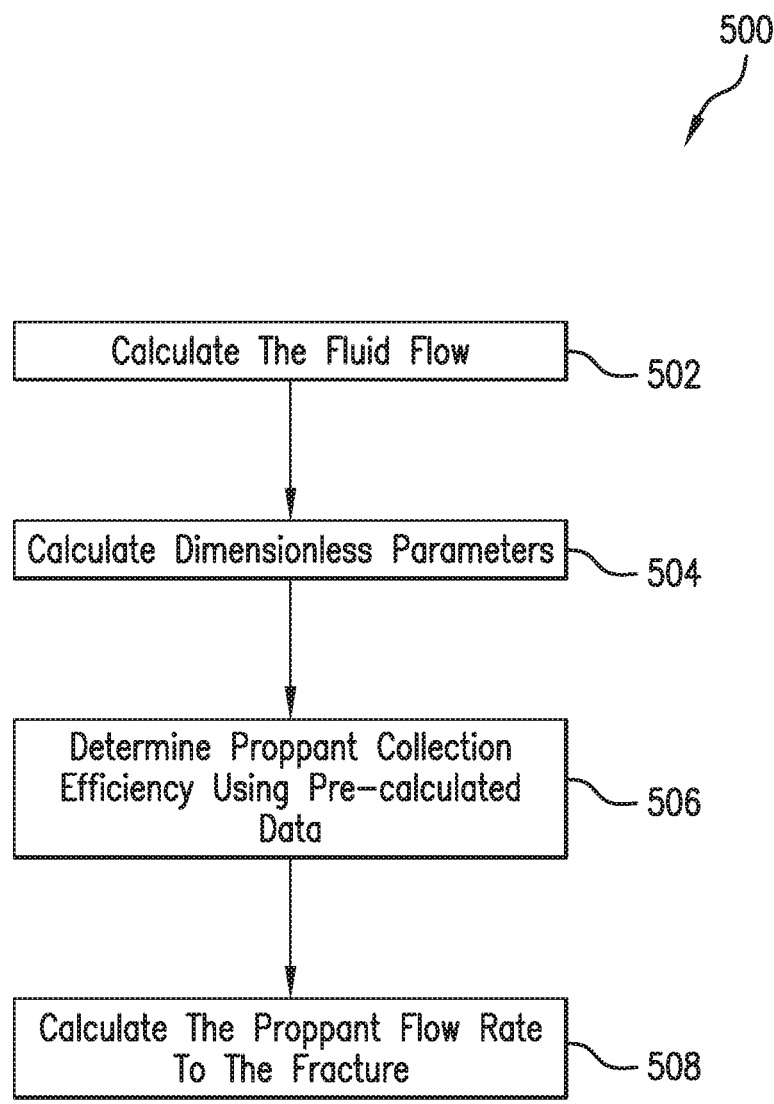
FIG. 5 is a flowchart of an illustrative process for calculating proppant flow rate to a fracture during a downhole fracturing operation.

Referring now to FIG. 5, a flowchart of an illustrative process 500 for calculating a flow rate of proppant to a fracture within a subterranean formation surrounding a section of a wellbore is shown. For example, process 500 may be used to calculate the flow rate of the proppant particles within fracturing fluid 317 to fracture 312 via perforation outlet 310 along wellbore section 300 of FIG. 3, as described above. Process 500 may be performed using, for example, a wellbore simulator executable at a computer system (e.g., a computer system 700 of FIG. 7, as will be described further below). However, it should be appreciated that process 500 is not intended to be limited thereto.

As shown in FIG. 5, process 500 begins in block 502, which includes calculating fluid flow. The fluid flow calculation in block 502 may include the flow of the fracturing fluid, including the fluid flow rate and flow ratio $\Pi_i$ (Equation 1) to the fracture of interest. Process 500 may then proceed to block 504, which includes calculating dimensionless parameters. The dimensionless parameters may represent a local flow around an individual perforated exit (e.g., perforation outlet 310 of FIG. 3, as described above) from the wellbore. The dimensionless parameters may be calculated based on properties of the proppant particles and the fracturing fluid. The dimensionless parameters may include, for example, the parameters $\Lambda$ and St for the fracture. The parameters $\Lambda$ and St may represent a local two-phase flow and may be defined by Equation (5), as described above.

In block 506, process 500 may include determining proppant collection efficiency R, based on the dimensionless parameters from block 504. In some implementations, the dimensionless parameters may be pre-calculated for different values of a Stokes number for non-Newtonian fluids prior to the stimulation treatment. The pre-calculated data may be stored in, for example, one or more pre-calculated tables or graphs, e.g., similar to plot graph 400 of FIG. 4, as described above, within a database or other data store accessible to the computer system during the stimulation treatment. Accordingly, the proppant collection efficiency may be determined in block 506 using pre-calculated data retrieved from the tables during the stimulation treatment without having to first perform the operations in blocks 502 and 504. The use of pre-calculated tables may allow proppant collection efficiency to be determined in real-time applications.

In block 508, process 500 may include calculating a proppant mass flow rate to the fracture. In one or more embodiments, the proppant mass flow rate may be calculated based on a combination of Equations (2) and (3) described above, e.g., as expressed using Equation (9) as follows:

$$Q_{pf} = R \times \Pi_i \times Q_{pw} \quad (9)$$

where $Q_{pw}$ is the total mass flow rate of the proppant through the wellbore or relevant portion thereof (e.g., wellbore section 300 of FIG. 3, as described above).

Advantages of process 500 may include, but are not limited to, allowing efficient calculation of the proppant flow rate to individual fractures and perforations based on pre-calculated and tabulated values of the collection efficiency as well as standardized calculation of the liquid flow rates within a well system (e.g., well system 104 of FIG. 1, as described above). In this way, process 500 may eliminate the need for corresponding 3D simulations of the proppant transport, which may be too computationally expensive for use in real-time applications. A proppant collection efficiency calculation may give a quick prediction about an amount of proppant that may be transported into the perforations. The proppant collection efficiency calculation may help to determine whether or not there is a desire amount of proppant in the fracture.

The results of Equations (1)-(9) described above (e.g., mass flow rates of the fracturing fluid, proppant collection efficiency R, dimensionless parameters which may define a local two-phase flow, particle mass flow rates, Stokes number, proppant mass flow rate, etc.) may be used for calculating proppant transport to fractures (e.g., fractures 100 of FIG. 1 or fracture 312 of FIG. 3, as described above) and estimating an appropriate amount of proppant delivered to individual fractures during the downhole stimulation treatment, e.g., a hydraulic fracturing operation, along the wellbore.

Figure 6:
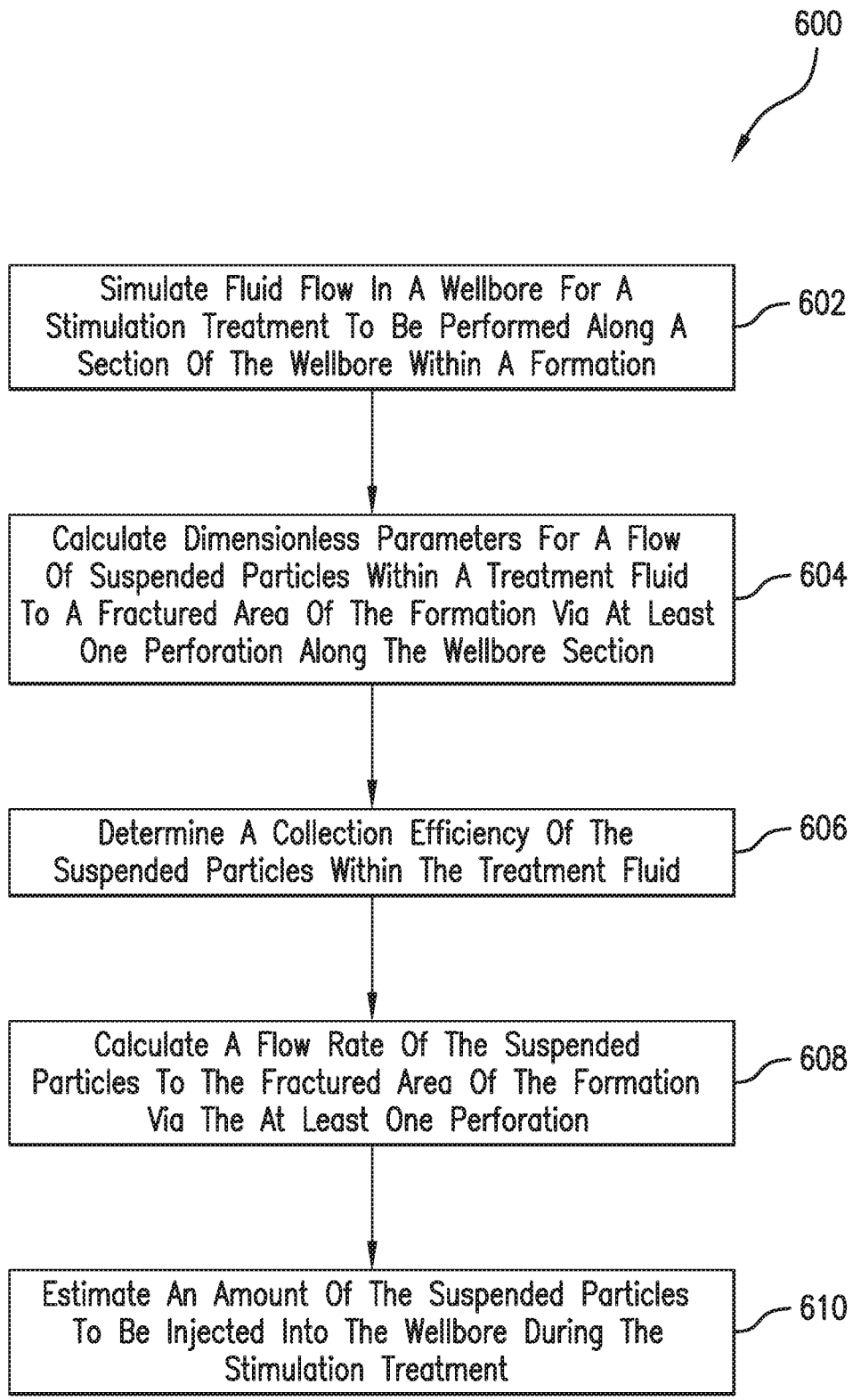
FIG. 6 is a flowchart of an illustrative process for controlling redistribution of suspended particles during downhole fracturing operations that use non-Newtonian fluids.

FIG. 6 is a flowchart of an illustrative process 600 for controlling the distribution or redistribution of suspended particles during downhole fracturing operations that use non-Newtonian fluids. In one or more embodiments, the suspended particles may be proppant particles. However, it should be appreciated that embodiments are not intended to be limited thereto. For example, in some implementations, the suspended particles may be particles of a diverting agent to be injected into the subterranean formation during a diversion phase of the stimulation treatment. Like process 500 of FIG. 5 described above, process 600 may be performed using, for example, a wellbore simulator executable at a computer system (e.g., a computer system 700 of FIG. 7, as will be described further below), but is not intended to be limited thereto.

As shown in FIG. 6, process 600 begins in block 602, which includes simulating fluid flow in a wellbore for a stimulation treatment to be performed along a section of the wellbore within a subterranean formation, based on a flow model associated with the wellbore. In one or more embodiments, the flow model may be a 1D flow model, as described above. The pre-calculated data may include, for example, pre-calculated tables or graphs, e.g., similar to plot graph 400 of FIG. 4, as described above Block 604 may include calculating dimensionless parameters characterizing a flow of suspended particles within a treatment fluid to a fractured area of the subterranean formation via at least one of a plurality of perforations along the section of the wellbore, based on the simulation performed in block 602. In one or more embodiments, the flow model used to perform the simulation may include a representation of the at least one perforation along the section of the wellbore. The treatment fluid may be a non-Newtonian fluid, e.g., a hydraulic fracturing fluid, which functions as a carrier fluid for the proppant particles during the stimulation treatment.

In block 606, a collection efficiency of the suspended particles within the treatment fluid may be determined, based on the dimensionless parameters from block 604. As described above, the suspended particles may be, for example, particles of proppant suspended within the treatment fluid, e.g., a non-Newtonian hydraulic fracturing fluid. Accordingly, the collection efficiency determined in block 606 may be a proppant collection efficiency. The proppant collection efficiency may be determined based in part on a ratio between mass flow rates of the treatment fluid in the wellbore and in at least one fracture within the fractured area of the subterranean formation, e.g., using Equations (1)-(4), as described above.

In some implementations, the operations in blocks 602 and 604 may be optional during the stimulation treatment and the collection efficiency may be determined in block 606 based on one or more tables of pre-calculated data, as described above. For example, the simulation in block 602 and the calculation of dimensionless parameters in block 604 may be performed prior to the stimulation treatment along the current section of the wellbore. The pre-calculated dimensionless parameters may be stored for different values of a Stokes number for non-Newtonian fluids in the table(s) within a database or other data store accessible to the computer system, which retrieves the data during the stimulation treatment. Accordingly, the particle collection efficiency determined in block 606 may be determined using pre-calculated data retrieved from the tables during the stimulation treatment without having to first perform the operations in blocks 602 and 604. As described above, the use of such pre-calculated tables may allow the collection efficiency to be determined in real-time applications by significantly increasing the calculation speed.

In block 608, a flow rate of the suspended particles to the fractured area of the surrounding formation via the at least one perforation may be calculated, based on the collection efficiency determined in block 606.

Process 600 may then proceed to block 610, which includes estimating an amount of the suspended particles to be injected into the wellbore, based on the flow rate determined in block 608.

In one or more embodiments, the stimulation treatment may be performed over a plurality of stages along corresponding sections of the wellbore within the subterranean formation. Each stage of such a multi-stage stimulation treatment may be performed along a corresponding section of the wellbore, and each section of the wellbore may include one or more perforations. Accordingly, the calculation of the dimensionless parameters (block 604), the determination of the collection efficiency (block 606), the calculation of the flow rate (block 608), and the estimation of the amount of the suspended particles (block 610) may be repeated for each perforation as each stage of the multi-stage stimulation treatment is performed along a corresponding section of the wellbore. In some implementations, the simulation of fluid flow (block 602) may also be repeated for each stage of the treatment and corresponding section of the wellbore.

An example of a practical application of the above-described techniques will now be described to further illustrate the characteristics of the embodiments disclosed herein. In this example, the following may be assumed: a flow of 4% of 0.4 mm sand particle suspension in water flow with velocity $V_{fw}2=2$ m/s in a pipe with an internal diameter $D_f=0.1$ m; and a fracture having an inlet diameter of 0.01 m and a flow velocity ($V_{tf}$) of 1.5 m/s. Using the data shown in plot graph 400 of FIG. 4, for a corresponding value of the Stokes number St=4.27 and a velocity ratio $\Lambda=0.75$, one can find the efficiency ratio R=0.83. Equation (4), as described above, may be used to calculate the proppant flow in the fracture, which in this example, yields an average proppant volume concentration $\alpha_{pf}=0.83\times0.04=0.0332$ and a proppant mass flow rate $Q_{pf}=3.03\times10^{-4}$ kg/s. The proppant flow rate in the fracture may then be used to estimate an amount of proppant to be injected into the wellbore, e.g., during a stage of the stimulation treatment along a perforated section or interval along the wellbore, as described above. For a series of consequent fractures, this process may be repeated to yield proppant flow distribution in the whole fracture system.

Figure 7:
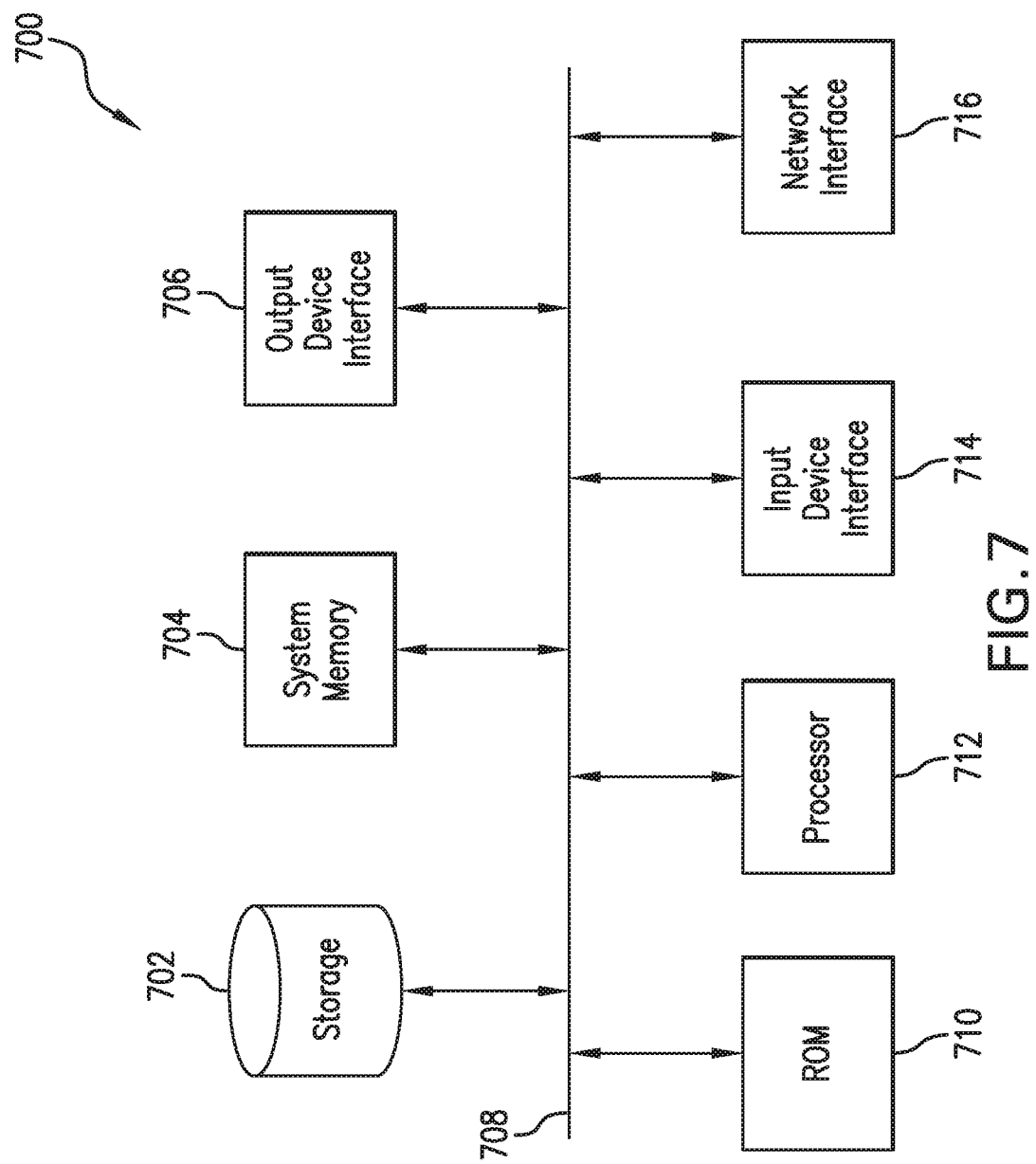
FIG. 7 is a block diagram of an illustrative computer system in which embodiments of the present disclosure may be implemented.

FIG. 7 is a block diagram of an exemplary computer system 700 in which embodiments of the present disclosure may be implemented. For example, processes 500 and 600 of FIGS. 5 and 6, respectively, as described above, may be implemented using system 700. System 700 can be a computer, phone, PDA, or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory (ROM) 710, processing unit(s) 712, an input device interface 714, and a network interface 716.

Bus 708 collectively represents all system, peripheral, and chipset buses that communicatively connect the numerous internal devices of system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for performing the techniques disclosed herein including, for example, processes 500 and 600 of FIGS. 5 and 6, respectively, as described above. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the system 700. Input devices used with input device interface 714 include, for example, alphanumeric, QWERTY, or T9 keyboards, microphones, and pointing devices (also called "cursor control devices"). Output device interfaces 706 enables, for example, the display of images generated by the system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network ("LAN"), such as an Intranet, or a wide area network ("WAN"), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 500 and 600 of FIGS. 5 and 6, respectively, as described above, may be implemented using system 700 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system may be a distributed computing system including clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for determining the operating conditions yielding optimal proppant flow rate to individual fractures in a multi-stage fracture system. In one embodiment of the present disclosure, a computer-implemented method of controlling suspended particle redistribution during stimulation treatments includes: simulating fluid flow in a wellbore for a stimulation treatment to be performed along a section of the wellbore within a subterranean formation, based on a flow model associated with the wellbore; calculating dimensionless parameters characterizing a flow of suspended particles within a treatment fluid to a fractured area of the subterranean formation via at least one of a plurality of perforations along the section of the wellbore, based on the simulation; determining a collection efficiency of the suspended particles within the treatment fluid, based on the dimensionless parameters; calculating a flow rate of the suspended particles to the fractured area of the subterranean formation via the at least one perforation along the section of the wellbore, based on the collection efficiency of the suspended particles within the treatment fluid; and estimating an amount of the suspended particles to be injected into the wellbore during the stimulation treatment along the section of the wellbore, based on the flow rate. Also, a computer-readable storage medium having instructions stored therein is disclosed, where the instructions, when executed by a computer, cause the computer to perform a plurality of functions, including functions to: simulate fluid flow in a wellbore for a stimulation treatment to be performed along a section of the wellbore within a subterranean formation, based on a flow model associated with the wellbore; calculate dimensionless parameters characterizing a flow of suspended particles within a treatment fluid to a fractured area of the subterranean formation via at least one of a plurality of perforations along the section of the wellbore, based on the simulation; determine the collection efficiency of the suspended particles within the treatment fluid, based on the dimensionless parameters; calculate a flow rate of the suspended particles to the fractured area of the subterranean formation via the at least one perforation along the section of the wellbore, based on the collection efficiency of the suspended particles within the treatment fluid; and estimate an amount of the suspended particles to be injected into the wellbore during the stimulation treatment along the section of the wellbore, based on the flow rate.

One or more embodiments of the foregoing method and/or computer-readable storage medium may further include any one or any combination of the following additional elements, functions or operations: the collection efficiency is determined based on pre-calculated dependencies of the collection efficiency on the dimensionless parameters; the suspended particles are particles of a diverting agent to be injected into the subterranean formation during a diversion phase of the stimulation treatment; the flow model includes a representation of the at least one perforation along the section of the wellbore; the stimulation treatment is performed over a plurality of stages along corresponding sections of the wellbore within the subterranean formation, each section of the wellbore including one or more perforations; the calculation of the dimensionless parameters, the determination of the collection efficiency, the calculation of the flow rate, and the estimation of the amount of the suspended particles are repeated for each perforation as each stage of the stimulation treatment is performed along a corresponding section of the wellbore; the treatment fluid is a non-Newtonian treatment fluid; the non-Newtonian treatment fluid is a hydraulic fracturing fluid; the suspended particles are proppant particles; the collection efficiency is a proppant collection efficiency, and the proppant collection efficiency is determined based in part on a ratio between mass flow rates of the treatment fluid in the wellbore and in at least one fracture within the fractured area of the subterranean formation; and the proppant collection efficiency is determined for different values of a Stokes number for non-Newtonian fluids.

Furthermore, a system is described, where the system includes at least one processor and a memory coupled to the processor having instructions stored therein, which when executed by the processor, cause the processor to perform functions including functions to: simulate fluid flow in a wellbore for a stimulation treatment to be performed along a section of the wellbore within a subterranean formation, based on a flow model associated with the wellbore; calculate dimensionless parameters characterizing a flow of suspended particles within a treatment fluid to a fractured area of the subterranean formation via at least one of a plurality of perforations along the section of the wellbore, based on the simulation; determine the collection efficiency of the suspended particles within the treatment fluid, based on the dimensionless parameters; calculate a flow rate of the suspended particles to the fractured area of the subterranean formation via the at least one perforation along the section of the wellbore, based on the collection efficiency of the suspended particles within the treatment fluid; and estimate an amount of the suspended particles to be injected into the wellbore during the stimulation treatment along the section of the wellbore, based on the flow rate.

One or more embodiments of the foregoing system may further include any one or any combination of the following additional elements, functions or operations: the collection efficiency is determined based on pre-calculated dependencies of the collection efficiency on the dimensionless parameters; the suspended particles are particles of a diverting agent to be injected into the subterranean formation during a diversion phase of the stimulation treatment; the flow model includes a representation of the at least one perforation along the section of the wellbore; the stimulation treatment is performed over a plurality of stages along corresponding sections of the wellbore within the subterranean formation, each section of the wellbore including one or more perforations; the calculation of the dimensionless parameters, the determination of the collection efficiency, the calculation of the flow rate, and the estimation of the amount of the suspended particles are repeated for each perforation as each stage of the stimulation treatment is performed along a corresponding section of the wellbore; the treatment fluid is a non-Newtonian treatment fluid; the non-Newtonian treatment fluid is a hydraulic fracturing fluid; the suspended particles are proppant particles; the collection efficiency is a proppant collection efficiency, and the proppant collection efficiency is determined based in part on a ratio between mass flow rates of the treatment fluid in the wellbore and in at least one fracture within the fractured area of the subterranean formation; and the proppant collection efficiency is determined for different values of a Stokes number for non-Newtonian fluids.

While specific details about the above embodiments have been described, the above hardware and software descriptions are intended merely as example embodiments and are not intended to limit the structure or implementation of the disclosed embodiments. For instance, although many other internal components of the system 700 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of controlling suspended particle redistribution during stimulation treatments, the method comprising:
simulating, by a computer system, fluid flow in a wellbore for a stimulation treatment to be performed along a section of the wellbore within a subterranean formation, based on a flow model associated with the wellbore;

calculating, by the computer system, dimensionless parameters characterizing a flow of suspended particles within a treatment fluid to a fractured area of the subterranean formation via at least one of a plurality of perforations along the section of the wellbore, based on the simulation;

determining, by the computer system, a collection efficiency of the suspended particles within the treatment fluid, based on the dimensionless parameters, the dimensionless parameters including a ratio between mass flow rates of the treatment fluid in the wellbore and at least one fracture within the fractured area of the subterranean formation;

calculating, by the computer system, a flow rate of the suspended particles to the fractured area of the subterranean formation via the at least one perforation along the section of the wellbore, based on the collection efficiency of the suspended particles within the treatment fluid;

estimating, by the computer system, an amount of the suspended particles to be injected into the wellbore during the stimulation treatment along the section of the wellbore, based on the flow rate; and controlling, via pumping equipment communicatively coupled to the computer system, an injection of the suspended particles into the wellbore as the stimulation treatment is performed, based on the estimated amount.

2. The method of claim 1, wherein the collection efficiency is determined based on pre-calculated dependencies of the collection efficiency on the dimensionless parameters.

3. The method of claim 1, wherein the suspended particles are particles of a diverting agent to be injected into the subterranean formation during a diversion phase of the stimulation treatment.

4. The method of claim 1, wherein the flow model includes a representation of the at least one perforation along the section of the wellbore.

5. The method of claim 1, wherein:
the stimulation treatment is performed over a plurality of stages along corresponding sections of the wellbore within the subterranean formation, each section of the wellbore including one or more perforations; and
the calculation of the dimensionless parameters, the determination of the collection efficiency, the calculation of the flow rate, and the estimation of the amount of the suspended particles are repeated for each perforation as each stage of the stimulation treatment is performed along a corresponding section of the wellbore.

6. The method of claim 1, wherein the treatment fluid is a non-Newtonian treatment fluid.

7. The method of claim 6, wherein the non-Newtonian treatment fluid is a hydraulic fracturing fluid.

8. The method of claim 1, wherein the suspended particles are proppant particles.

9. The method of claim 8, wherein the collection efficiency is a proppant collection efficiency.

10. The method of claim 9, wherein the proppant collection efficiency is determined for different values of a Stokes number for non-Newtonian fluids.

11. A system comprising:
at least one processor; and
a memory coupled to the at least one processor having instructions stored therein, which, when executed by the at least one processor, cause the at least one processor to perform a plurality of functions, including functions to:
simulate fluid flow in a wellbore for a stimulation treatment to be performed along a section of the wellbore within a subterranean formation, based on a flow model associated with the wellbore;
calculate dimensionless parameters characterizing a flow of suspended particles within a treatment fluid to a fractured area of the subterranean formation via at least one of a plurality of perforations along the section of the wellbore, based on the simulation;
obtain pre-calculated dependencies for a collection efficiency of the suspended particles on the dimensionless parameters;
determine the collection efficiency of the suspended particles within the treatment fluid, based on the pre-calculated dependencies and a ratio between mass flow rates of the treatment fluid in the wellbore and at least one fracture within the fractured area of the subterranean formation;
calculate a flow rate of the suspended particles to the fractured area of the subterranean formation via the at least one perforation along the section of the wellbore, based on the collection efficiency of the suspended particles within the treatment fluid; and
estimate an amount of the suspended particles to be injected into the wellbore during the stimulation treatment along the section of the wellbore, based on the flow rate.

12. The system of claim 11, wherein the suspended particles are particles of a diverting agent to be injected into the subterranean formation during a diversion phase of the stimulation treatment.

13. The system of claim 11, wherein the flow model includes a representation of the at least one perforation along the section of the wellbore.

14. The system of claim 11, wherein:
the stimulation treatment is performed over a plurality of stages along corresponding sections of the wellbore within the subterranean formation, each section of the wellbore including one or more perforations; and
the calculation of the dimensionless parameters, the determination of the collection efficiency, the calculation of the flow rate, and the estimation of the amount of the suspended particles are repeated for each perforation as each stage of the stimulation treatment is performed along a corresponding section of the wellbore.

15. The system of claim 11, wherein the treatment fluid is a non-Newtonian treatment fluid.

16. The system of claim 15, wherein the non-Newtonian treatment fluid is a hydraulic fracturing fluid.

17. The system of claim 11, wherein the suspended particles are proppant particles.

18. The system of claim 17, wherein the collection efficiency is a proppant collection efficiency.

19. The system of claim 18, wherein the proppant collection efficiency is determined for different values of a Stokes number for non-Newtonian fluids.

20. A computer-readable storage medium storing instructions that, when executed by a computer, cause the computer to perform a plurality of functions, including functions to:
simulate fluid flow in a wellbore for a stimulation treatment to be performed along a section of the wellbore within a subterranean formation, based on a flow model associated with the wellbore;

calculate dimensionless parameters characterizing a flow of suspended particles within a treatment fluid to a fractured area of the subterranean formation via at least one of a plurality of perforations along the section of the wellbore, based on the simulation;

determine a collection efficiency of the suspended particles within the treatment fluid, based on the dimensionless parameters, the dimensionless parameters including a ratio between mass flow rates of the treatment fluid in the wellbore and at least one fracture within the fractured area of the subterranean formation;

calculate a flow rate of the suspended particles to the fractured area of the subterranean formation via the at least one perforation along the section of the wellbore, based on the collection efficiency of the suspended particles within the treatment fluid;

estimate an amount of the suspended particles to be injected into the wellbore during the stimulation treatment along the section of the wellbore, based on the flow rate; and control, via pumping equipment communicatively coupled to the computer, an injection of the suspended particles into the wellbore as the stimulation treatment is performed, based on the estimated amount.

* * * * *